US006409902B1

(12) United States Patent
Yang et al.

(10) Patent No.: US 6,409,902 B1
(45) Date of Patent: Jun. 25, 2002

(54) RAPID PRODUCTION OF ENGINEERING TOOLS AND HOLLOW BODIES BY INTEGRATION OF ELECTROFORMING AND SOLID FREEFORM FABRICATION

(75) Inventors: Bo Yang, Kearny; Ming C. Leu, Pine Brook, both of NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/370,649

(22) Filed: Aug. 6, 1999

(51) Int. Cl.⁷ .............................. C25D 1/10; C25D 1/00
(52) U.S. Cl. ........................................... 205/70; 205/67
(58) Field of Search ............................. 205/70, 122, 67

(56) References Cited

U.S. PATENT DOCUMENTS

| | | | |
|---|---|---|---|
| 4,373,127 A | 2/1983 | Haskett et al. | 219/69.15 |
| 4,459,453 A | 7/1984 | Inoue | 219/69.17 |
| 4,647,748 A | 3/1987 | Glassman | 219/69.15 |
| 4,952,768 A | 8/1990 | Mohri et al. | 219/69.15 |
| 5,108,555 A | 4/1992 | Nishimuro et al. | 205/184 |
| 5,250,172 A | 10/1993 | Vargas-Gutierrz et al. | 205/70 |
| 5,435,902 A * | 7/1995 | Andre, Sr. | 205/67 |
| 5,439,622 A | 8/1995 | Pennisi et al. | 264/401 |
| 5,453,173 A * | 9/1995 | Oyama et al. | 205/70 |
| 5,458,825 A | 10/1995 | Grolman et al. | 264/401 |
| 5,461,769 A | 10/1995 | McGregor | 29/527.4 |
| 5,507,336 A | 4/1996 | Tobin | 164/34 |
| 5,545,367 A | 8/1996 | Bae et al. | 264/401 |
| 5,614,075 A * | 3/1997 | Andre, Sr. | 205/67 |
| 5,616,293 A | 4/1997 | Ashtianu-Zarandi et al. | 264/401 |
| 5,641,448 A | 6/1997 | Yeung et al. | 264/401 |
| 5,718,951 A | 2/1998 | Sterett et al. | 427/466 |
| 5,728,345 A | 3/1998 | Hlavaty et al. | 264/401 |
| 5,818,005 A | 10/1998 | Pratt et al. | 219/69.15 |
| 5,900,207 A | 5/1999 | Danforth et al. | 264/603 |
| 5,937,265 A * | 8/1999 | Pratt et al. | 419/6 |
| 5,976,339 A * | 11/1999 | Andre, Sr. | 205/70 |

OTHER PUBLICATIONS

Arthur et al., 1996, Rapid Prototyping J, 2:4–12 Month/Year not available.

Arthur, 1996, "Rapid EDM electrodes using stereolithography models—combining pin matrix and electroplating techniques", 2$^{nd}$ national conference on developments in rapid prototyping and tooling, UK Month Not Available.

Aubin et al., 1997, Chapter 11 "Tooling Applications" of JTEC/WTEC Panel Report on Rapid Protytping in Europe and Japan, Mar. 1997.

Blum et al., 1949, "Principles of Electroplating and Electroforming", McGraw–Hill, Inc, 3$^{rd}$ ed. Month Not Available.

Bocking et al., 1997, GEC J Technol, 14:66–74 Month Not Available.

(List continued on next page.)

Primary Examiner—Donald R. Valentine
Assistant Examiner—Erica Smith-Hicks
(74) Attorney, Agent, or Firm—Klauber & Jackson

(57) ABSTRACT

This invention describes a rapid tooling process that integrates solid freeform fabrication (SFF) with electroforming to produce metal tools including molds, dies, and electrical discharge machining (EDM) electrodes. An SFF part is metalized by electroless plating and then placed in an electroplating solution, where metal is deposited upon the part by electrolysis. When the desired thickness of metal has been reached, the SFF part is removed from the metal shell. The shell is then optionally backed with other materials to form a mold cavity, and EDM electrode, or other desired parts for tooling. Thermomechanical modeling and numerical simulation with finite element analysis (FEA) is used to determine the geometry of the SFF part and the electroform thickness for minimizing the manufacturing time and cost while satisfy the tooling requirement.

12 Claims, 17 Drawing Sheets

OTHER PUBLICATIONS

Cheshire et al., 1997, "Manufacturing of plastic injection mold using sterolithography EDM Electrodes", Proceedings of $6^{th}$ European Conference on Rapid Prototyping and Manufacturing, University of Nottingham, England. $1^{st}$—3rd, Jul., 1997.

Killander et al., 1995, Ann CIRP, 44:451–4 January.

Jacobs et al., 1996, 3D Systems Internal R&D Report, P/N 70270/10–15–96.

Leu et al., 1998, A feasibility study of EDM tooling from stereolithography, Submitted to North American Manufacturing Research Conference, NAMRC XXVI, May, 1998, Atlanta, USA.

Li et al., 1992, Dies and Molds Industry, 2:35–43 (English language abstract provided by inventor is attached) Month Not Available.

Lu, 1991, Dies and Molds Industry,4:61–3 (English language abstract provided by inventor is attached) Month Not Available.

Spiro, 1968, Electroforming, Robert Draper LTD. Month Not Available.

Stein, 1996, "A Practical Guide to Understanding, Measuring and Controlling Stress in Electroformed Metals", AESF Electroforming Symposium, Mar. 27–9,, Las Vegas, NV.

Wang et al., 1990, Dies and Molds Industry, 8:45–7 (English language abstract provided by inventor is attached). Month Not Available.

Yao et al., 1998 Shell cracking in investment casting with laser sterolithography patterns, SFFS Austine.doc, 1–14 May.

Zhu et al., 1992, Dies and Molds Industry, 2:45–50 (English language abstract provided by inventor is attached) Month Not Available.

* cited by examiner

Step 1. Build complementary EDM RP pattern

Step 2. Metallizing the surface of the pattern

Step 3. Metal electroforming

Step 4. Filling the cavity with selected materials

Step 5. Separation to form an EDM electrode

SL master

Nickel electroform

Tin-lead backed mold

SL master

Finished EDM electrode

EDMed workpiece

FIG. 20A
FIG. 20B
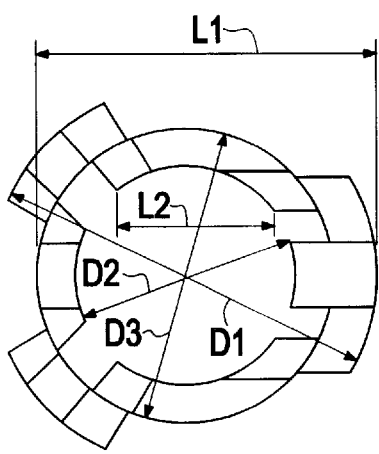
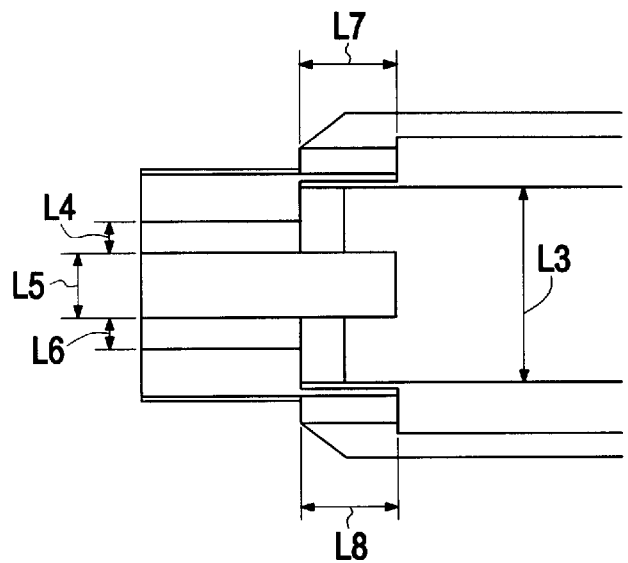

Example 3

Example 3

Example 4

Example 4

Example 5

Example 6

Oven temperature = 833 K (560°C)
R=50mm, L=100mm
A and t are variables

SL part with A=0mm, t=2mm

SL part with A=0mm, t=4mm

SL part with A=25mm, t=2mm

SL part with A=25mm, t=4mm

RAPID PRODUCTION OF ENGINEERING TOOLS AND HOLLOW BODIES BY INTEGRATION OF ELECTROFORMING AND SOLID FREEFORM FABRICATION

BACKGROUND OF THE INVENTION

1. Field of the Invention

The present invention relates generally to a solid freeform fabrication and electroforming system, and more particularly to a solid freeform fabrication and electroforming system for use in the production of engineering tools and hollow bodies.

2. Description of the Related Art

Electroforming is the use of electrodeposition of metal onto a master to replicate the master in a reversed format to produce a metal shell. The master, which has the required shape, dimension, accuracy and roughness, is sinked into an electrolyte bath as the cathode and is deposited a required layer of metal, normally copper or nickel. If the master is nonconductive, it needs to be metalized before electroforming. The metal shell is separated from the master to form the mold cavity. Electroforming can be used to reproduce the reversed shell of a wide variety of parts and shapes, the principal limitation being that it must be possible to separate the master from the metal shell, similar to the situation that the molding part must be able to be removed from the mold cavity. Electroforming has been used for dies and molds fabrication. With the development of the electroforming technology, alloy, such as Ni—Co, can be deposited onto the master to form an alloy shell so that the strength and hardness of the mold can be largely improved.

Electroforming was invented by M. H. Jacobi of the Academy of Science of St. Petersburg, Russia in 1838. It was initially used to copy antique masterpieces in the last century. Currently, electroforming is widely used in manufacturing, electronics, aerospace, automotive, and art reproduction. Electroformed parts most commonly are made of nickel, iron, copper, or silver, and thicknesses up to 16 mm (⅝ inch) have been deposited successfully. However, a variety of other types of materials have been used including other types of metals and rubber. Metals deposited by electroforming have their own distinct properties. Dimensional tolerances are very good, often up to 0.0025 mm (0.0001 inch), and surface finishes of 0.05 mm (2 microinches) can be obtained quite readily if the master is adequately smooth. The main obstacle to the development of the electroforming is the manufacturing of the master. In some less technology advanced countries, electroforming is widely used to copy the shape of an imported complex part. The copied shell is used as the mold cavity.

The emergence of the solid freeform fabrication (SFF) technology has brought about new opportunities in rapid prototyping, tooling and manufacturing. Many kinds of models can be made using available RP machines, such as Stereolithography Apparatus (SLA), Selective Laser Sintering (SLS), Three Dimensional Printing (3DP), Fused Deposition Modeling (FDP), Laminated Object Manufacturing (LOM), etc.

The use of such RP technologies has brought about new opportunities in the utilization of electroforming for making of molds, dies, EDM electrodes and hollow bodies as discussed in the present invention. Masters can be made using the mentioned RP machines. After the RP master is metalized, an electroform is made from the master with the interface layer conforms intimately to the master. However, separation of the electroform from the master may not be easy and the difficulty increases as the form complexity increases. Traditionally, the master is removed by extraction (pull-off), heat-softening, melting or chemical dissolution. Separation of RP master by mechanical pull-off has been found impractical, however, since extreme care and skills are required during the pulling off process in order not to damage the metal shell. The pulling force may break the master thus leaving some master relic in the metal shell, especially when the master is brittle and intricate in shape. Pull-off can not be used if the master is enveloped in the metal shell such as a hollow-body electroform of complex shape. Dissolving the RP master in a chemical solution to separate the metal shell by causing delamination of the interface layer may be possible but the time taken may be excessive. Melting, incineration or heat softening may be applied to wax or polymer RP masters for separating the electroform from the master. A major problem is that these materials have much higher coefficients of thermal expansion than the electroformed metal. During the process of heating up the electroformed object, the expansion of the RP master can significantly deform the metal shell. The use of thermal cycling to separate a polyurethane master from a metal shell has been attempted, but those skilled in such attempts recognize that removal of an SL master is more difficult than removal of a polyurethane part. This is due to the fact that an SL part is more brittle and tends to fracture during the removal process. Thus, an SL part is merely used as a master to create a vacuum cast mold used to produce a polyurethane master for electroforming.

Another shortage of electroforming for making complex tools is the slowness and inefficiency of the electroforming process, due in-part to the non-uniformity of the distribution of the current density between the anode and the cathode. The deposition speed is directly proportional to current density. The master areas which are closer to the anode have higher current density so more metal is plated onto these protruding areas of the master than onto the recesses. The faster deposition in these areas consequently increases the current density and thus makes the deposition rate in these areas higher and higher, and likewise the deposition rate in the recess areas lower and lower. The uneven distribution of current density results in not only uneven distribution of the electroform but also undesirable distribution of its metallic microstructure. Furthermore, dendrite or like crystalline formations tend to build up on certain localized areas for a master with complex geometry due to the non-uniformity of current density. In order to reduce these build-ups, the electroforming process is often carried out at a minimum current density. As a consequence, it may take many days for the electroformed metal layer to reach a desired thickness. However, the undesired unevenness can not be completely eliminated even at a low current density. It has thus been a common practice to interrupt the electroforming process from time to time, remove the object being electroformed from the electroforming machine, and transfer it to a cutting machine for removing dendrite and part of the metal deposited at the protruding areas to reduce the increasing current density at these areas. After each such cutting stage, the metal layer needs to be fully degreased, washed, cleaned, and then the part is returned to the electroforming machine. Since the timing for the need of such removal is generally difficult to predict, the electroforming process is often constantly monitored or interrupted from time to time in order to take the object out and observe the deposition situation. Electroforming at a higher current density accelerates the deposition rate, but it worsens the non-uniformity and increases the rate of dendrite buildup. Thus electroforming without a conformal anode is labor-intensive, time-consuming, energy-consuming, and costly. Also, it wastes chemicals and other useful resources. Conforming the shape of the anode to the shape of the work piece to be electroformed can provide a uniform distribution of current density, thus the metal can be deposited onto the work piece more uniformly. However, making of a conformal anode by machining is also expensive and time consuming.

Heat dissipation for most of molding processes such as injection molding is critical for reducing the molding cycle. The mold is a heat exchanger most of the energy (heat) added to the plastic in the mold extruder to make it soft and suitable for injection must be removed before the mold can be opened to eject the product. The common practice is to make cooling channels inside the mold. Cooling oil or water are flowing through the cooling channels to take the heat away. The more efficient the cooling layout, the faster the heat is removed, and the shorter the molding cycle. This is where the designer often finds the greatest challenge: to design the cooling channels so that the plastic in the mold cavity is quickly and evenly cooled. It is often difficult and expensive to provide cooling to small areas near large accumulations of heat. Cooling channels conforming the shape of the mold cavity is difficult or impossible to make by machining.

OBJECTS AND SUMMARY OF THE INVENTION

It is an object of the present invention to combine the benefits of speed and precision found in rapid prototyping with the precision of electroform deposition for the production of molds, EDM electrodes and hollow bodies.

It is a further object of the present invention to provide a method for the rapid isolation of electroform material following deposition on a rapid prototyping master.

It is yet another object of the present invention that rapid isolation of the electrofrom material is achieved by burn-out of the rapid prototyping master.

It is an advantage of the present invention that the shape of the rapid prototyping master is maintained during electroform deposition and the shape of the electroform material is maintained during burn-out.

It is a further advantage of the present invention to determine the thickness of the rapid prototyping master during the design to maintain the shape of the design during deposition and burn-out.

It is a feature of the present invention that the rapid prototyping master incorporates a thickness sufficient to withstand electroform deposition and insufficient to cause deformation of electroform material deposited thereon during burn-out.

It is another feature of the present invention to provide a conforming anode for use during electroform deposition.

The objects, advantages of the present invention are incorporated in a system for the design and production of molds, EDM electrodes or hollow bodies through the combination of a rapid prototyping design and manufacturing machine, an electroform deposition bath and burn-out oven. The rapid prototyping design and manufacturing machine is adapted to provide a rapid prototyping master configured to withstand electroforming stresses. The electroform deposition bath deposits a layer of electroformed material onto the rapid protyping master. Following the deposition of the electroformed material a burn-out oven removes the rapid prototyping master from the electroformed material in which the rapid prototyping master is further configured to minimize stress on the electroformed material during burnout.

Advantageously, the rapid prototyping design and manufacturing machine includes a procedure for minimizing the thickness of the rapid prototyping master to minimize stress on the electroformed material during burn-out. The procedure further determines a maximum thickness of the rapid prototyping master to minimize electroforming deformation on the rapid prototyping master during electroform deposition.

The rapid prototyping design and manufacturing machine further includes a procedure for the manufacture of a conforming anode that operates cooperatively with the rapid protyping master during electroform deposition to ensure a even deposition of the electroformed material. Other features and advantages of this invention will be made apparent upon review of the drawings and detailed description of the invention.

BRIEF DESCRIPTION OF THE FIGURES

The present invention will be understood and appreciated more fully from the following detailed description taken in conjunction with the appended drawings in which like components are designated by like reference numerals:

FIG. 20 is the dimensions measured for SL master of part a of FIG. 18 and its corresponding metal cavity of part c of FIG. 18.

DETAILED DESCRIPTION OF THE PREFERRED EMBODIMENT(S)

Figure 1:
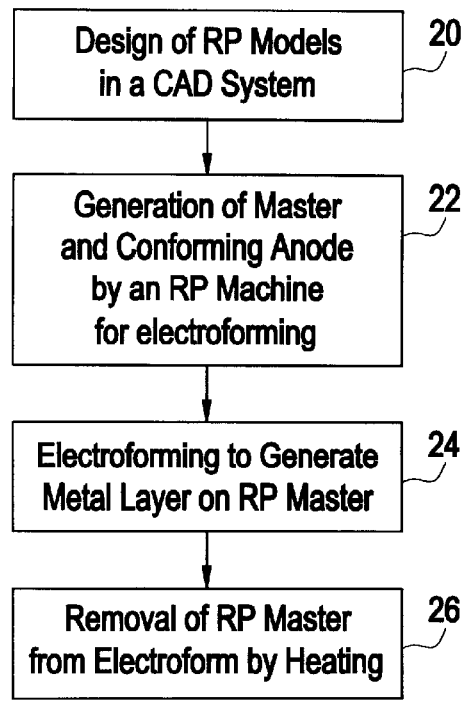
FIG. 1 is a block diagram of an electroforming tooling system of the present invention.
Figure 2:
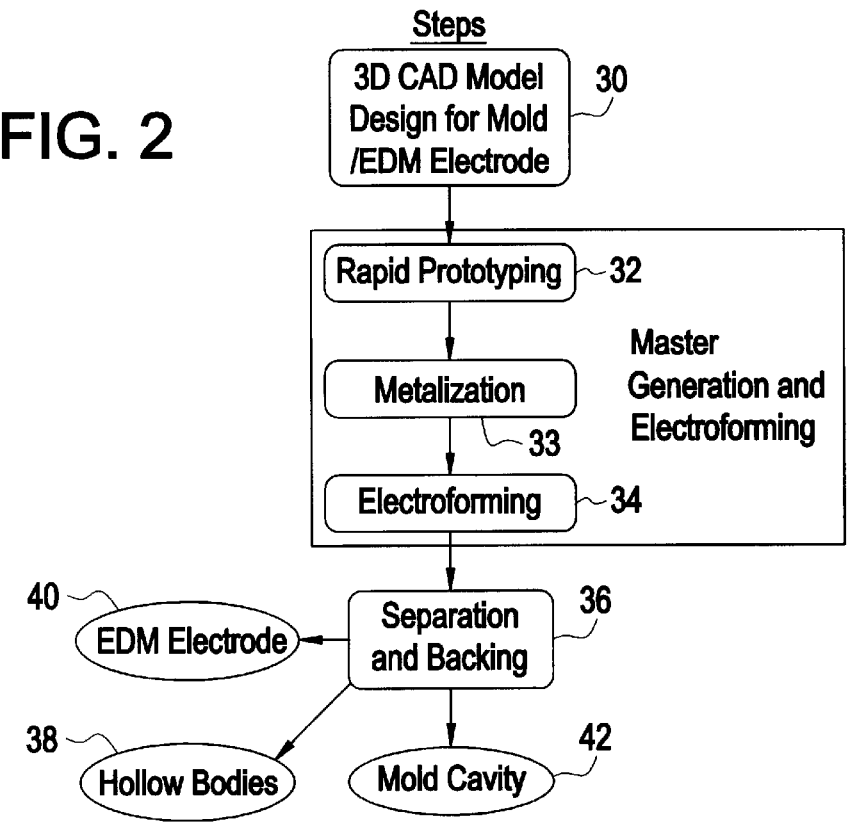
FIG. 2 is a block diagram of a tooling process of the present invention.

The present invention overcomes the difficulties of combining rapid prototyping with electroforming processes, such as long build time, large amount of master material, non-uniformity of deposition, difficulty in removing master, and difficulty in making conformal cooling channels. Such difficulties are overcome through the novel combination and utilization of a Computer Aided Design workstation 20 cooperatively coupled to a rapid prototyping machine 22 with an electroforming bath 24 and burnout oven 26. Advantageously, these devices are cooperatively operated through the novel steps of:

(a) Designing an electroform master at step 30 that is designed and made generally hollow with the help of the CAD (Computer-Aided Design) software system. The generally hollow master has a generally uniform thickness that varies relative to the amount of detail and other structural properties of the system. The thickness is determined by two criteria: (1) the thickness is large enough to withstand the stress generated during the electroforming process; and (2) the thickness is thin enough to minimize the generation of thermal stress which can deform the electroformed metal shell. The determination of the thickness for the generally hollow structure is performed using a finite element analysis method. The hollowed shell structure can be constructed following determination of the shell thickness using, for example, a SHELL command in most of commercial CAD systems. This technique reduces the material and time needed for building a rapid prototyping master, but most importantly an RP master produced from this technique solves the thermal expansion problem during the separation process and also can resist the electroforming stress. Furthermore, an anode may be generated from the master design that conforms to the inverse shape of the RP master by the CAD system using the geometrical data of the RP master. The conforming anode enables the distribution of metal in the electroform more uniformly (and thus results in smaller variation in the electroform thickness). This eliminates the necessity of removing the object to be electroformed from the electroforming machine for removing the dendrite, as well as lessening the difficulty of electroforming for corners, bores, recesses, deep cavities, and the like geometric features (compared with the usual electroforming).

(b) Master generation of the RP master and optional anode, metalizing the RP master and electroforming a layer of metal upon the RP master at steps 32–34 that preferably uses the conforming anode to evenly distribute the electrical current density within the electroform bath.

(c) Removing the rapid prototyping model at step 36 from the electroform by heat (instead of removing by mechanical or chemical means), such as burnout of the master. This is quicker than other process and eliminates potential damage of the electroform surface. The larger thermal expansion coefficient of the SL resin or other plastic polymers (compared with metals) will induce large thermal stress. However, the design of the generally hollow structure inside the master can substantially decrease the thermal stress and ensure the accuracy requirement of the mold to be made. This technique can be applied to any master made of wax, resin, paper, plastic, polymer and polymer-mixed metal powder.

It will be appreciated by those skilled in the art that hollow bodies 38 with complex inner shapes, which are difficult to make by other means, can be made by the present invention. Additionally, EDM electrodes 40 and mold cavities 42 in accordance with the present invention may be produced and further include the step of backing of the electroform mold.

With continued reference to FIG. 1, the steps involved in this invention for rapid making of molds, dies, EDM electrodes, and hollow-bodies are described more fully below.

(1) Design of CAD Models.

Figure 8:
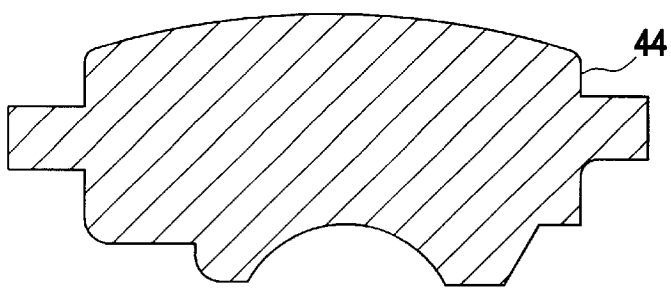
FIG. 8 is a sectioned view of a part to be made in accordance with the present invention.

A CAD model of a mold, EDM electrode, or hollow-body is generated according to parameters of the part 44 to be produced. FIG. 8 illustrates an example of such a part 44 to further understanding of the application. It will be appreciated by those skilled in the art that any shape capable of manufacture may be substituted for the illustration of FIG. 8. The part 44 is modeled in the three dimensional CAD system 20 (FIG. 1). A computer Aided Design System of the type suitable for this purpose includes a computer software such as Pro/Engineer™ manufactured by Parametric Technology Corporation of Waltham, Mass. or I-DEAS™ manufactured by SDRC Structural Dynamics Research Corporation of Cincinnati, Ohio. The computer data of the part used to create the CAD model of the electroforming master and conforming anode for electroplating may be generated by the user or provided by a third party. The design of the CAD model for making of the RP master from the computer data requires several considerations for successful making of the mold EDM electrode and hollow bodies. As mentioned before, the RP materials generally have much larger thermal expansion but smaller strength than most of metals and alloys. In the present invention, the RP master is separated by burnout of the master during which relatively large thermal stresses will be generated during the burnout process, and which vary according to the structure of the RP master. The thermal stress in some structures can be as large as 800 MPA (mega pascal) that is much larger than the yield strength of the most metals. The CAD model advantageously accommodates for these stresses by providing an RP model that minimizes the effect of thermal expansion on the metals electroformed thereon.

Internal web structures have been used to reduce the thermal stress for investment casting; however, the principal of the web structure in investment casting is that the web can be easily buckled during the heating process in investment casting. The web structure works for the investment casting because the strength of the RP master is only for supporting a layer of ceramic slurry and normal handling without resisting large stress. However, the use of internal web structure in the invented process for reducing thermal stress during the burnout process has shown to be undesirable. The reason is that the RP master needs to withstand large electroforming stress during the metal layer buildup in the electroforming process. Experiments in connection with the present invention have discovered that if a web structure configured for conventional ceramic slurry casting is used in an electroforming process, the electroforming stress will significantly deform the RP master so that the accuracy of the fabricated object is lost. Examples of such experiments are shown in FIGS. 15A, 15B and 16B and described more fully below.

The design of the RP master for the part 44 should include a thickness sufficient to withstand the electroforming stress, but not so thick so as to generate thermal stress that could damage the electroform during the burnout process. The design of a generally hollow structure for the RP master has been experimentally and analytically shown to be a successful method for overcoming these problems.

Figure 3:
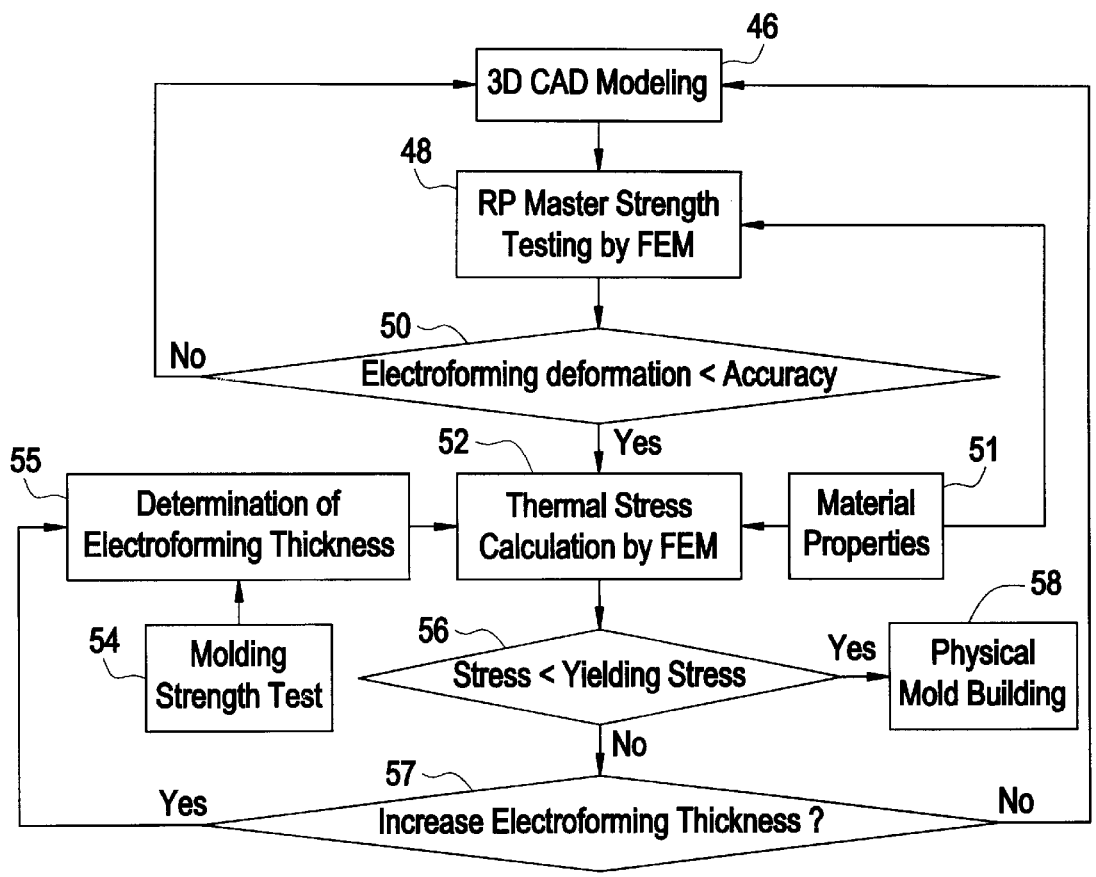
FIG. 3 is a block diagram illustrating the logic sequence for determining the preferred electroform thickness and structure of an RP master.

With reference to FIG. 3, a procedure for determining the design parameters of the RP master relative to the electroform shall be determined. Initially, the program utilizes a 3D CAD model of the part to be formed at step 46. The model design may be generated herewith or may be provided as a data file from a third party. The initial thickness of the model is chosen. A good starting value is 2 mm; however, other thicknesses may be used depending on the part design shape among other factors known to those of skill in the art. The CAD data is the process using an FEA algorithm to determine the effect of electroforming stress on the model at step 48.

The pressure induced by electroforming stress is applied on the surface of the RP master. The material properties and boundary conditions of the RP master are then defined at step 51 and applied to the FEA analysis. The software then performs the calculation of the deformation caused by the electroforming stress at step 48. The deformation is then compared to an accuracy threshold at step 50. If the deformation is larger than the accuracy requirement of the tool to be fabricated, the wall thickness is increased to perform the analysis again until the deformation is smaller than the accuracy requirement.

Following the determination of a desired thickness for RP master to resist electroforming stress. A thermal stress analysis is performed at step 52. The stress analysis incorporates the material properties data at step 51 and using a molding strength test parameter at step 54, the electroform material thickness is added at step 55.

The resulting stress calculated is compared to yield strength of the electroform at step 56. If the stress is greater than yielding stress further analysis are required. A flag value at step 57 determines whether the analysis will require changes to the electroform thickness or the RP master thickness. The flag is user determined as application specific. If the stress is less than yield stress at step 56 then the design is approved for generation of prototype at step 58.

Figure 4:
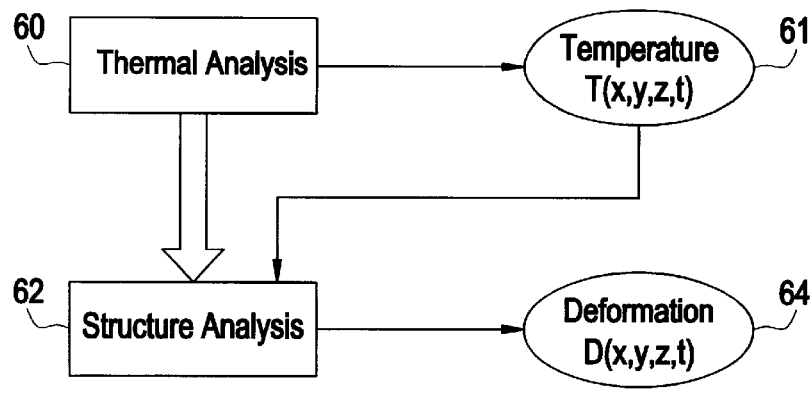
FIG. 4 is a block diagram of a thermal stress calculation procedure according to the present invention.

The theory underlying these results recognizes that thermal stress induced by burnout of the SL part is a multi materials, non-linear, transient thermal-mechanical coupled problem. The modeling of the thermal stress can be divided into two steps: thermal modeling and structural modeling. Thermal modeling is to compute the transient temperature field $T(x,y,z,t)$ during the burnout process. Structure modeling is to calculate the thermally-induced deformation of the structure using the temperature calculated by the thermal analysis. By the theory of thermo-elastic, the thermal stress can be derived from the deformation. FIG. 4 illustrates the analysis procedure wherein the Thermal analysis is first performed at step 60 to determine the temperature identified by reference numeral 61 and then the Structure Analysis is performed at step 62 to determine the deformation identified by reference numeral 64.

The thermal stress analysis 46 can be performed by commercially available software in connection with the Finite Element Analysis (FEA) software. A Thermal Stress Analysis software package of the type suitable for this purpose is ANSYS manufactured by ANSYS of Canonsburg, Pa. The analysis of the thermal stress 60 is carried out as shown in FIG. 5.

Figure 5:
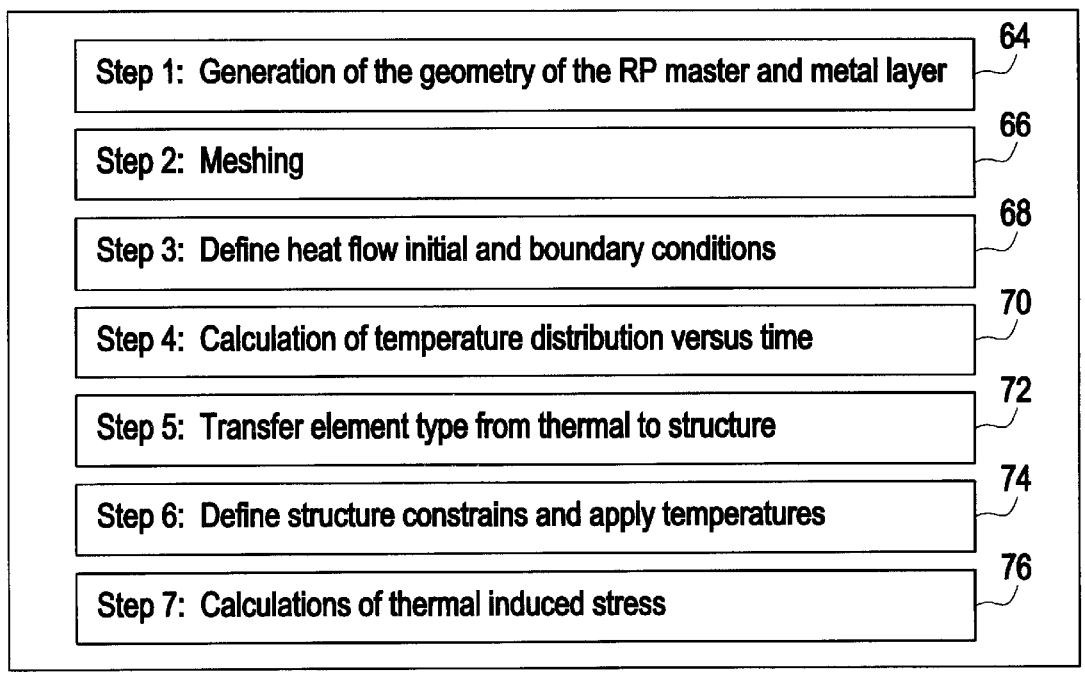
FIG. 5 is a block diagram for the steps of thermal stress calculation of the present invention.

With reference to FIG. 5, the geometry of the RP master and the metal layer covering the master are preferably generated in the ANSYS software at step 64. However, the geometry can also be imported from a conventional CAD file that constructs the required geometry. The electroform thickness is a parameter initially determined to be around 2 mm. After the geometry has been created at step 64, the geometry model is meshed at step 66. Meshing is defined as creation of finite elements based on the model geometry. The geometry is divided into nodes and finite elements to which element type and material properties are assigned. The element type has to be suitable for thermal analysis. Next, the heat flow initial and boundary conditions are defined at step 68, and the finite element model for thermal analysis is calculated at step 70. After the thermal analysis is finished 70, a structure analysis will be made to compute the thermal stress due to the thermal influence at step 72. For computing the thermal stress, the element type is changed to another type which is appropriate for structure analysis. Computed temperatures in the thermal analysis are defined at step 74 as the loads to the finite element model. The system then computes the thermal deformation and, according to the deformation, the thermal stress can be calculated at step 76.

Figure 6:
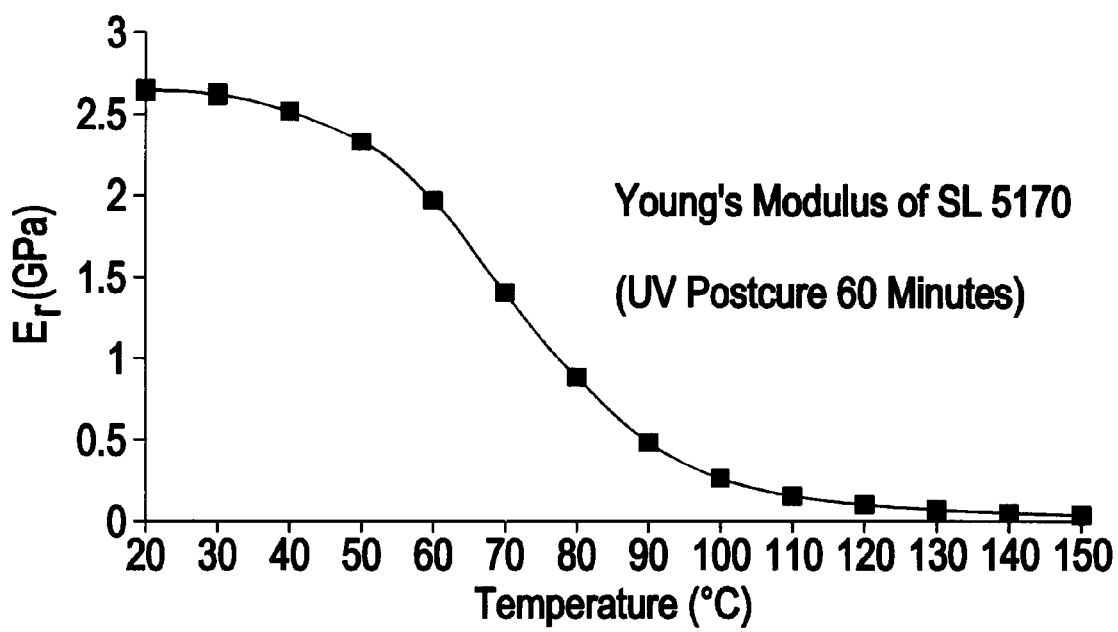
FIG. 6 is a graph illustrating Young's Modulus of rapid prototyping material versus temperature.
Figure 7:
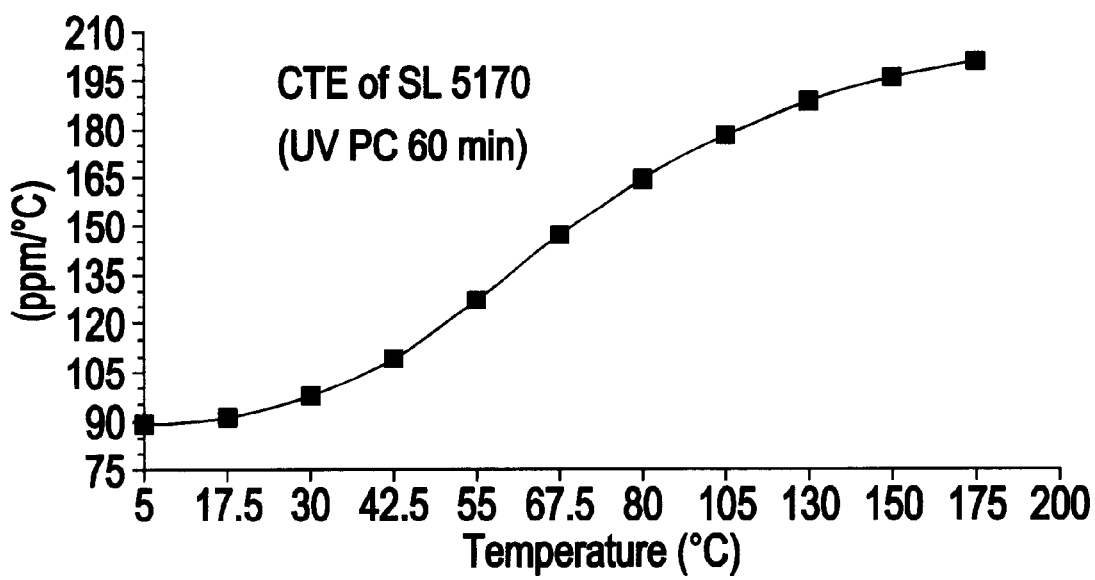
FIG. 7 is a graph illustrating the coefficient of thermal expansion of rapid prototyping material versus temperature.

The mechanical and thermal properties of the RP master and electroformed metal are included to perform finite element analysis of the thermal stress generated during the burnout process. These properties need to be put into the analysis software. A rapid prototyping material of the type suitable for the present invention is SL5170 manufactured by Ciba Specialty Chemicals Inc. of Los Angeles, Calif. Other suitables may include but are not limited to wax, ABS plastic, EPOXY resins and the like. The mechanical and thermal properties of SL 5170 at 20° C. are listed in Table 1. FIGS. 6 and 7 illustrate the Young's modulus and coefficient of thermal expansion (CTE) of the SL 5170 versus temperatures, respectively. The typical mechanical and thermal properties of electroformed copper and nickel at 20° C. are listed in table 2.

TABLE 1

Mechanical and thermal properties of SL 5170 at 20° C. (UV Post Cured 60 minutes).

| Properties | Value | Properties | Value |
| --- | --- | --- | --- |
| Tensile strength | 59–60 MPa | Thermal expansion coefficient | 90 ppm/k |
| Tensile modulus | 2,500–2,650 MPa | Thermal conductivity | 0.2002 W/m. ° C. |
| Flexural strength | 107–108 MPa | Specific heat | 1758.8 J/kg. ° C. |
| Flexural modulus | 2,920–3,010 MPa | Density | 1.22 g/cm$^3$ |
| Poison ratio | 0.40 | | |

TABLE 2

Mechanical and thermal properties of electroformed copper and nickel at 20° C.

|  | Copper (sulfate solution) | Nickel (sulfamate solution) | Annealed wrought nickel |
| --- | --- | --- | --- |
| Ultimate Strength (Mpa) | 192 | 650 | 310 |
| Yield Strength (Mpa) | 120 | 488 | 128 |
| Tensile Modulus (Gpa) | 79 | 286 | 110 |
| Vickers Hardness | 118 | 196 | 124 |
| Internal Stress (Mpa) | −0.55–2 | −2–6 | N/A |
| Poison Ratio | 0.3 | 0.28 | 0.29 |
| Density (g/cm$^3$) | 8.9 | 8.8 | 8.8 |
| Melting Temperature (° C.) | 1080 | 1450 | 1453 |
| CTE (ppm/k) | 17 | 12.6 | 13.3 |
| Thermal conductivity (W/m.° C.) | 399 | 91 | 91 |
| Specific heat (J/kg.° C.) | 383 | 446 | 446 |

Figure 9:
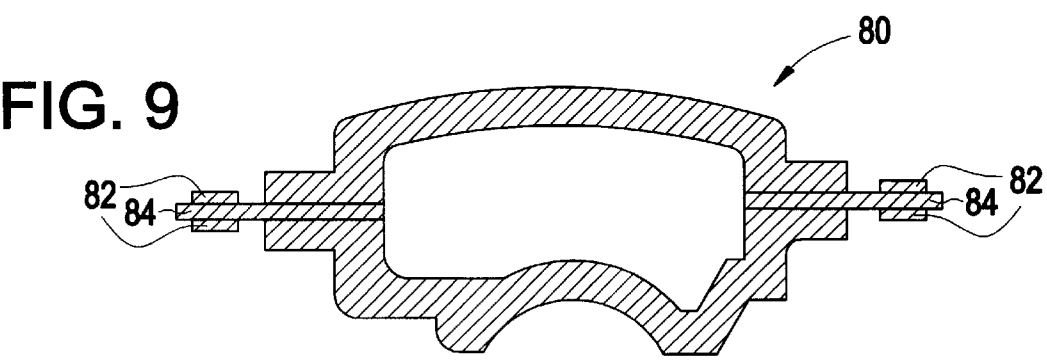
FIG. 9 is a sectional view of the electroform master of FIG. 8.
Figure 10A:
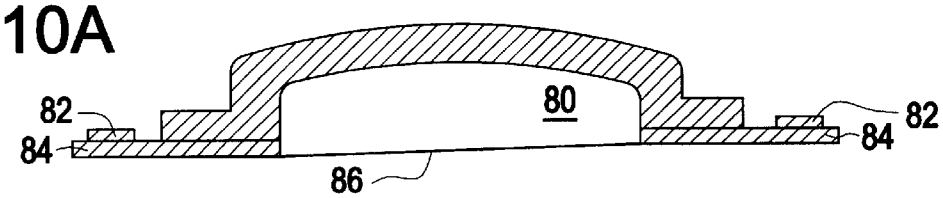
FIG. 10 is a sectional view of a top portion of the electroform master of FIG. 9, and a sectional view of a bottom portion of the electroform master of FIG. 9.
Figure 10B:
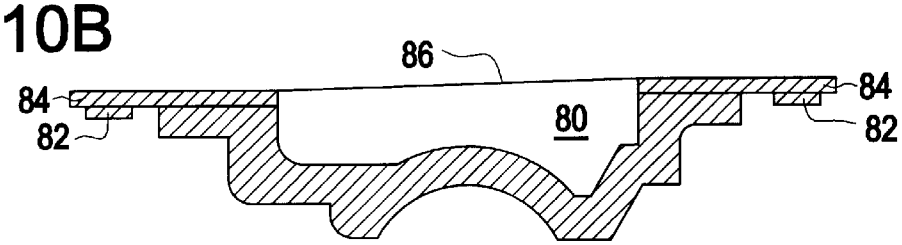
Figure 11:
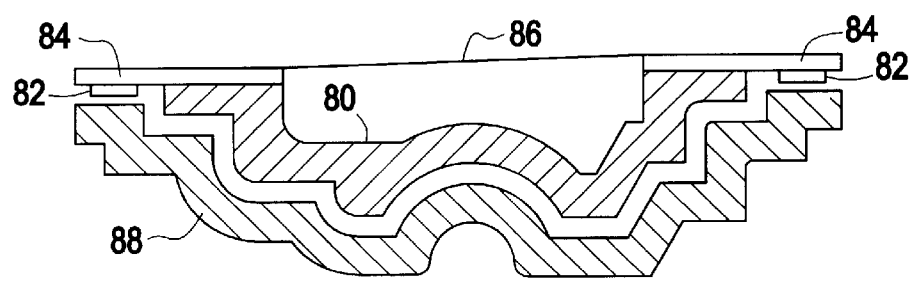
FIG. 11 is the bottom portion of FIG. 10 with a conforming anode.

With reference to FIG. 9, a CAD model for generation of an RP master for producing a mold or EDM electrode under the present invention in which the RP master for electroforming is built as a whole object 80 with an inner hollow structure. This hollow structure has many advantages, such as saving building material, reducing building time, and more importantly it solves the thermal expansion problem so as to improve the accuracy of the mold to be made. The thickness of the shell is determined by generally two criteria as discussed above. One is that the thickness must be large enough to withstand the electroforming stress and to be handled normally. The other criteria is that the thickness should be small enough so that the electroform deformation induced by thermal expansion of the RP master during the process of burning out the RP master is within the range of mold accuracy requirement. The thermally induced stress can deform or even crack the electroformed metal shell because the coefficient of thermal expansion of the material for making RP master, such as SL resin, ABS plastic, etc, is much larger than that of the metal. A generally hollow RP model covered by a layer of metal with a predetermined electroforming thickness is used as a FEA model to simulate the thermal deformation during the master burnout process. After the appropriate shell thickness is determined as stated above, the hollow structure 80 in FIG. 9 is generated according to the procedure defined above and varies according to the properties of the RP master material, the amount of electroforming stress, the geometry and the accuracy of the object to be made Pin molds 82 found on the surplus component 84 on this model are used for lining up the two mold halves after the master has been electroformed, cut into halves, and then removed. The diameter of the component is determined by the diameter of the pins (FIG. 14) which are used for align the two mold halves. The height of component is about the thickness of the electroform, normally 0.5 to 5 mm. The surplus component 84 on the model is used to cut the electroformed master to two halves (FIG. 10). The arrangement of the surplus 84 is determined by the arrangement of the parting lines of the mold. The thickness of the component 84 is typically of 4 to 10 mm, depending on the used cutting method. The surplus component is also used to constrain the growth of the electroforming metal to facilitate the matching of the two mold halves. The merits of designing a CAD model like FIG. 9 include forming the RP model as an integral part so that it can be electroformed at one time and providing strength so that it is more rigid to withstand electroforming distortion. The drawback is that the cutting it into halves of the electroformed master can be difficult, especially when the mold parting surface is curved. FIG. 10 is a section view of an alternative design of the CAD model for building the electroforming RP master. FIG. 10A is the top-half of the electroforming master and FIG. 10B is the bottom-half of the electroforming master in which both halves are cut on the CAD machine. The advantage of this design is that the support for building the RP part can be built on the surface 86 of the surpluses 84. The support can be removed easily without affecting the surface quality of the RP part. The surpluses 84 are used to constrain the growth of the electroform so that the mold when cut into halves can be more accurately matched to produce products. FIG. 11 illustrates the section view of the CAD model of the conforming anode 88 which conforms the shape of the electroforming master 80. The CAD model of the conforming anode 88 can be generated by offsetting a predetermined distance from the surface of the master model 80. The CAD data for generating the conforming anode model 88 can be derived from the data for generating the CAD model 80 of the electroforming master and is applied to correspond to both the top and bottom halves. Thus the conforming anode 88 may be used for model in FIG. 9 whether cut into halves and electroformed or electroformed as a whole object.

(2) Master Generation and Electroforming.

Figure 12:
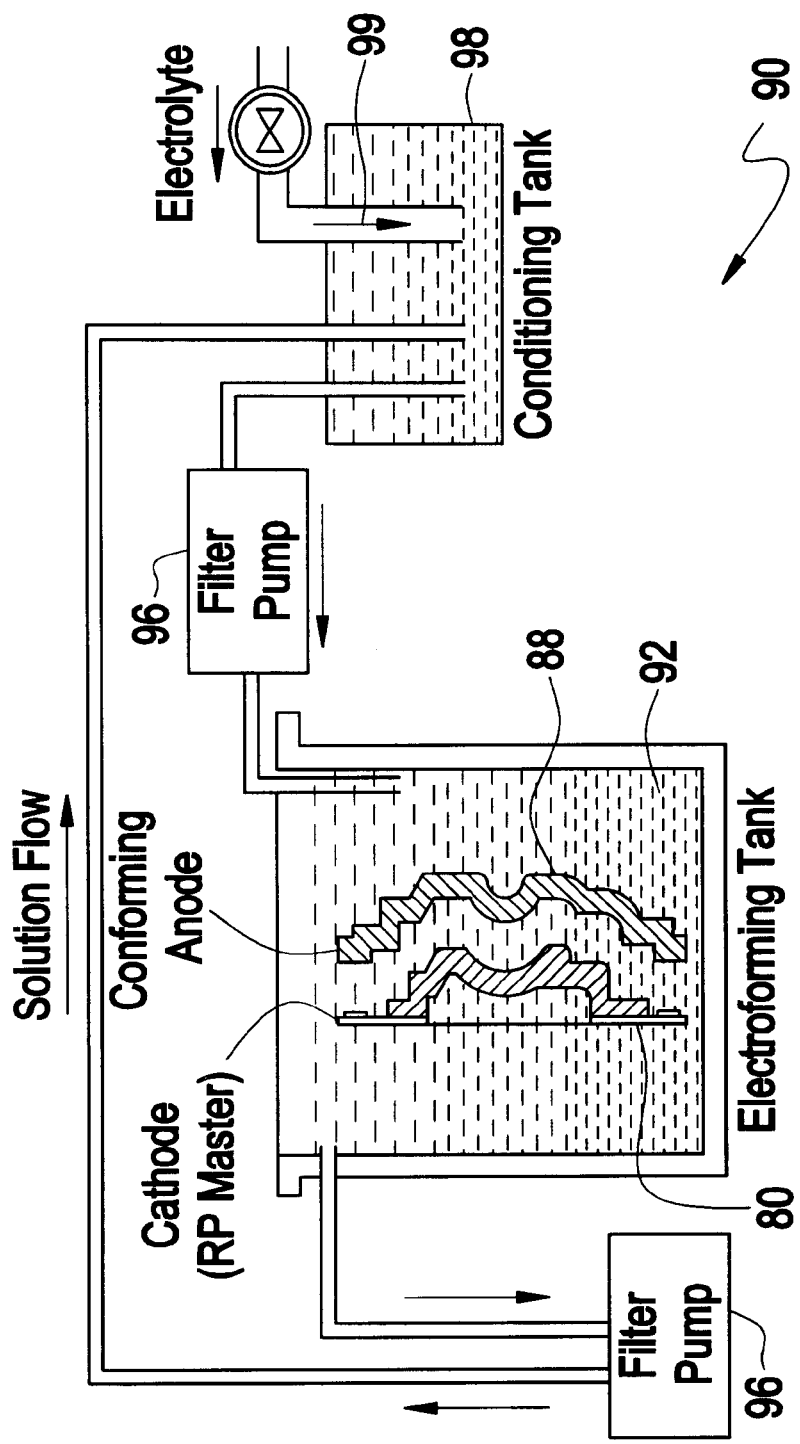
FIG. 12 is a diagrammatic view of an electroforming bath.

After the CAD models are generated, the models are transformed into STL file format by the CAD system. These files are the input to control an RP machine for building the electroforming master(s) and conforming anode models. The electroforming master is first metalized using electroless plating. Electroless plating, a process involving an autocatalytic or chemical reduction of aqueous metal ions onto a base substrate, can produce a uniform pinhole-free metal film on the entire surface regardless of the complexity of part geometry. The pin molds 82 in FIG. 9 and FIG. 10 are not metalized so that the top surface of those component will not be electroformed. This design enables making holes in electroform for putting pins used to align the two mold halves. The top surfaces of pin molds 82 and side faces of the surplus component 84 are covered by a conventional stick nonconductive sheet (not shown) to prevent them from being metalized. The surfaces 86 and side surfaces of component 84 in FIGS. 10A and 10B are also covered by the non-conductive stick sheet to prevent them from metalization. The conforming anode is preferably metalized using electroless plating of metals which belong to the platinum group. The platinum group metals are insoluble inside the electroplating bath. The conforming anode provides uniform distribution of current density between the cathode (electroforming master) and the anode so it can make uniform deposition of metal on the entire surface of a plating part. FIG. 12 illustrates a typical installation for nickel electroforming setup 90. The conforming anode 88 offsets a distance from the metalized RP master (cathode) 80. The concentration of metal ions in the electroplating solution 92 are kept at a constant level by automatically adding electrolyte metal shown by arrow 94 into the electroplating solution. The automatic controlling unit which detects and adjusts the concentration of the metal ions in the solution using filter pumps 96 and a conditioning tank 98 is conventionally built-in to most of electroforming machines.

Figure 13A:
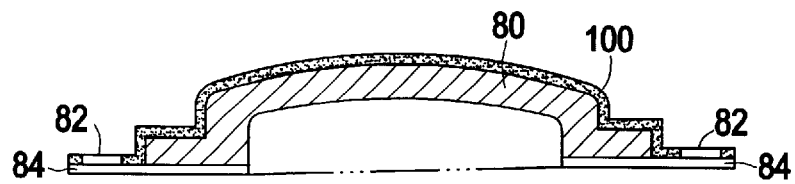
FIG. 13 is the electroform masters of FIG. 10 having a layer of metal electroformed thereon.
Figure 13B:
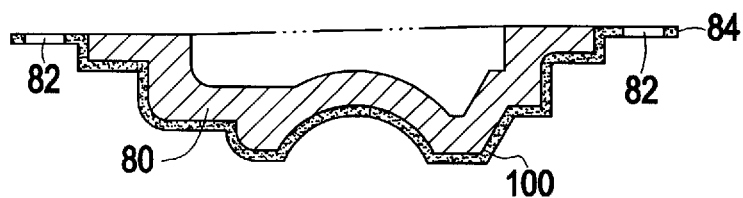

When the required thickness of metal has been deposited, the electroforming master covered by deposited metal is removed from the electroplating solution. The electroformed master with structure illustrated in FIG. 9 is preferably cut into two halves. This cutting also removes the surplus 84 illustrated in FIG. 9. At this cutting process, special care needs to be paid to avoid any removal of the electroformed metal. After this cutting, the bottom half of the electroformed master (FIG. 10) includes an electroform material 100 as illustrated in section view of FIG. 13. Similarly, the top half electroformed master (FIG. 10) is coated with an electroform material 100 as illustrated in the section view of FIG. 13.

(3) Removal of the RP Masters.

Removing of RP masters from the metal shell is difficult and sometimes impossible using mechanical means such as pull-off without damaging the electroform. It is time consuming using chemical means such as resolving of the master. In the invented process, the RP masters are removed from the metal shell by heat, such as burnout of thermosetting plastics, softening or melting of wax and thermoplastics. As mentioned previously, the thermal stress induced by heating an RP master such as an SL master can deform or even crack the metal shell because the coefficient of thermal expansion of the RP material is much larger than that of the electroformed metal. However, the appropriate design of the generally hollow structure invented here can prevent such problem. The thermal stress is largely reduced by the generally hollow structure by providing space for the master to expand inward. For example, for a specific geometry of the RP master, experimental calculations have shown when heating a 100 mm round and 100 mm height SL resin cylinder covered by a 2 mm thick nickel shell to 80° C., the maximum thermal stress is 248 MPa. However, when a 50 mm diameter inner hole is made inside the master, the thermal stress is reduced to 142 MPa. The observed temperature for complete incineration of the SL master is about 560° C. The time taken for burnout is dependent on the size of the SL master, but typically ranging from one to three hours.

Producing a Mold: Backing and Setting Conforming Cooling Channels.

Figure 14:
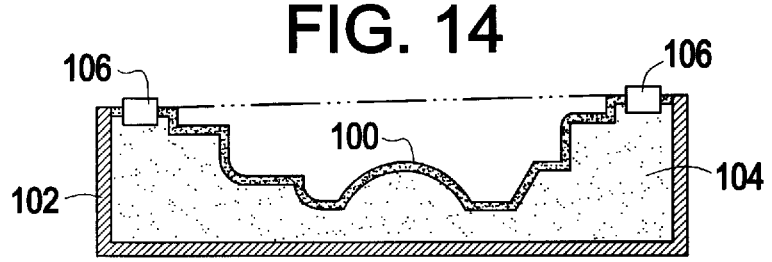
FIG. 14 is the metal layer of FIG. 13 having a backing.
Figure 15:
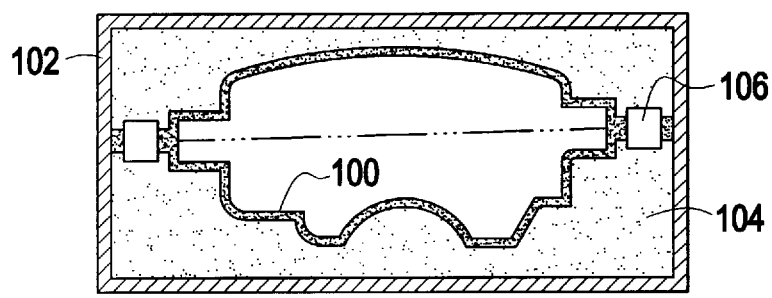
FIG. 15 is the metal layers of FIG. 13 having backings formed thereon.

After the master is removed from the metal shell, the shell is ready to be backed with low melting alloy (which has a melting temperature range from 75° C. to 750° C.) to form a mold cavity. FIG. 14 illustrates the backing and setup of the bottom-half of a mold. The backing and setup for the top-half can be done similarly. A metal box 102 is used as a frame to hold the backing material 104 and as the base for connecting the mold plate on the molding machine. Cooling channels (typically a copper pipe with a inner diameter of 2 to 10 mm and a thickness of 1 to 8 mm) can be put around the electroformed metal shell before backing (not shown). This conforming cooling channel can significantly reduce the heat dissipation time in injection molding and other molding processes. Another alternative for backing electroformed nickel shell to form a high strength mold is to back a nickel electroform with copper by copper electroplating. The deposition rate of copper is two to three times higher than that of nickel. Copper has higher thermal conductivity (399 W/m° C.) than that of nickel (91 W/m° C.). So this backing also provide a perfect conformal cooling substrate. Pins 106 are mounted inside the hole of the electroform to provide a datum for lining the two mold. halves. After all these are done, the metal box 102 and the electroform 100 are preheated to the temperature about the melting temperature of the backing alloy, then the molten alloy is poured inside the metal box. Cooling to solidify the molten alloy forms a solid mold cavity with built-in conforming cooling channels. FIG. 15 illustrates two halves of mold cavities that are matched and aligned perfectly by the method and process invented herein.

Producing an EDM Electrode

Figure 16:
FIG. 16 is a block diagram illustrating the coding steps for making an EDM electrode.
Figure 16:
Figure 16:
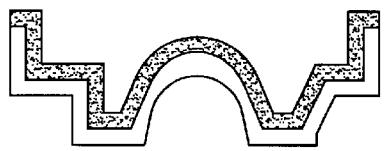
Figure 16:
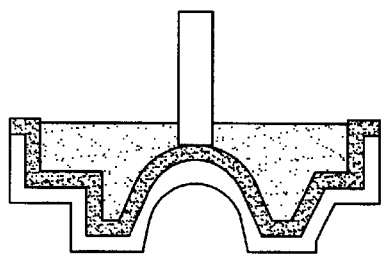
Figure 16:
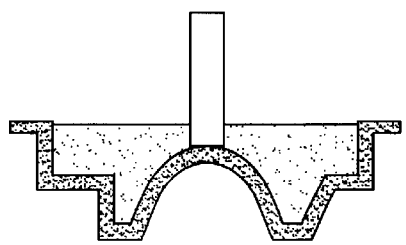

The process for rapid making of EDM electrodes is similar to that for rapid making of molds. FIG. 16 illustrates the process for making of an EDM electrode using the invented method and process. The negative (complementary) geometry of the EDM electrode is modeled by a CAD system at step 108 and prototyped by RP techniques for use as the electroforming master. Similar to the design of RP master for electroforming in the rapid making of molds and dies, the RP master for rapid making of EDM electrodes can be made as a shell with uniform thickness in order to minimize deformation during the master removal process, to save build materials, and to reduce build time. The master shell should also be thick enough to resist the deformation that could be generated during the electroforming process. The dimensions of the shelled RP master can be determined by the finite element analysis to ensure that deformations generated by electroforming and heating to remove the master are within the accuracy requirement of the EDM electrode. A CAD model which conforms the shape of the master geometry is also modeled by using the geometrical data of the CAD model of the EDM electrode. Metals with good electrical and thermal conductivity, such as copper, are often electrodeposited. The master is then metalized 110 and a metal layer is then deposited 112. After electroforming, the back of the electroform is first filled with low melting alloy 114 and then the master is removed 116 by heat to form an EDM electrode. An alternative is that the master is removed by heat and the back of the electroform is filled with low melting alloy (not shown).

Producing a Hollow Body

Figure 17:
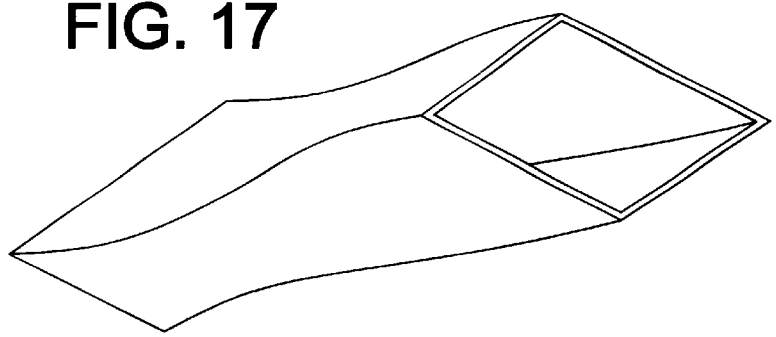
FIG. 17 is a hollow body that can be made by the present invention.

A thin walled metal hollow-body can be made using the steps (108), (110) and (112) as described above with the following small variations. The master is made as a whole with the geometry and surface quality matching the shape and surface quality of the inner structure of the hollow-body to be made. The RP master also needs to be hollow. The metal shell can be directly electroformed to the required thickness without backing. The outside surface of the electroformed metal shell is post-processed such as sanding or polishing to form the hollow object. This technique meets the challenge of making products and components that are difficult or impossible to make in any other ways, such as making waveguides, wind tunnels and venturi nozzle. These products have an intricate inner shape, surface finish, and accurate dimensions. FIG. 17 shows an exemplary CAD model of a hollow object which can be made using the invented method and process.

Figure 18A:
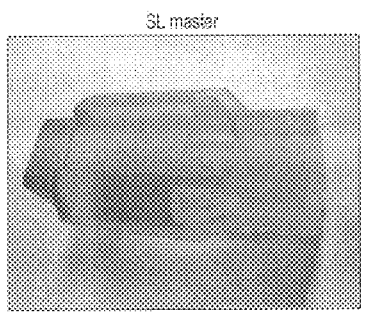
FIG. 18 illustrates a mold at various stages of formation in accordance with the present invention.
Figure 18B:
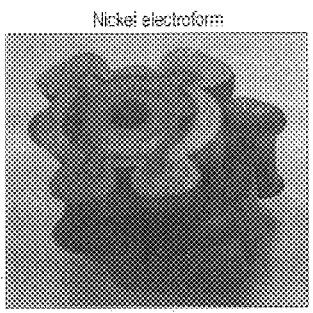
Figure 18C:
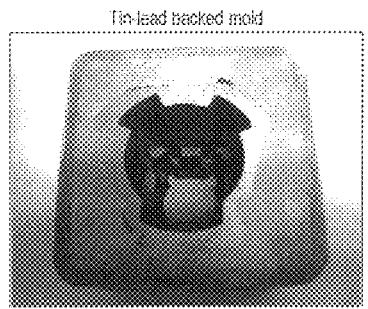
Figure 19A:
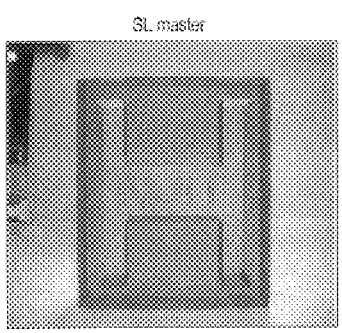
FIG. 19 illustrates an EDM electrode at various stages of formation in accordance with the present invention.
Figure 19B:
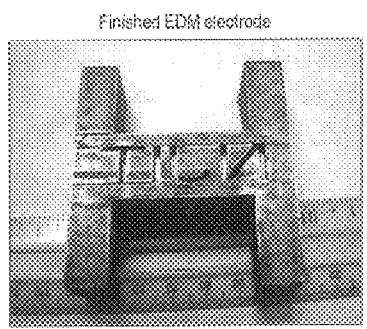
Figure 19C:
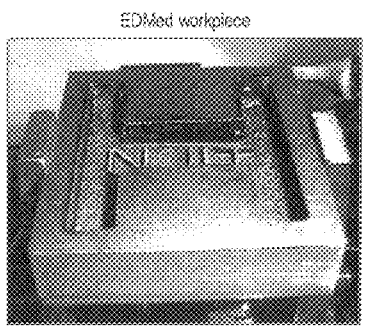

FIG. 18 illustrates a mold cavity made by the invented method and process. FIG. 18A shows the electroforming master made by stereolithography (SL). Part b of FIG. 18 shows the hollowed master electroformed with nickel for an average thickness of 2 mm (without using a conforming anode). Part c of FIG. 18 shows the backfilled mold cavity. FIG. 19 illustrates an EDM electrode made by the invented method and process. Part a of FIG. 19 shows the electroforming master made by SL with complementary geometry of the EDM electrode. Part b of FIG. 19 shows the backfilled EDM electrode. FIG. 19C shows a machined work piece by the EDM electrode.

EXPERIMENTAL EXAMPLES

Generally speaking, removal of RP master by force-pull-off from electroform is difficult without damaging the electroformed metal. It is also impossible to remove RP master from the metal shell if the master is designed to include twisted or rotated sections.

Example 1

Solid RP Master (SL Master) with Chemical Dissolution Methods.

Experiments were first tried on chemical dissolution of the RP master for separation of electroformed metal from the RP master. The material of the RP master is SL resin (an epoxy resin used for SL RP machine). Acetonic solution is the most powerful chemical solution for dissolving the SL resin so is was used to dissolve the solid SL master after it is nickel electroformed. It was found that dissolving the SL master in this chemical solution to separate the metal shell by causing delamination of the interface layer may be possible but the time taken is very excessive. A nickel electroformed SL part, like the one shown in FIG. 18B, to dissolve the SL master, took five days, but the dissolution of the SL part was just a small portion and the SL master can not be removed. Even using a web structure inside the RP master, the time taken for dissolving the RP master was still not desirable. So other separation approaches were then tried.

Example 2

Solid SL Part with Burnout

After the failure of separation of RP master from metal by chemical dissolution, the idea of burnout of the RP master was tried. A solid SL part, as shown in FIG. 18A, was electroformed with nickel at a plating thickness of 2 mm. Then the SL master was burned at an oven with temperature at 560° C. After two hours, the SL part was completely burnout, but the electroform was deformed significantly. The nickel shell was measured using a Coordinate Measuring Machine (CMM) and compared the data with the original SL part. The following table 3 is data we measured using the dimensions shown in parts A and B of FIG 20. As the data shown, the dimensional deviations are too large to be accepted for molding accuracy requirement after the burnout of the SL master. This is because the thermal stress induced by thermal expansion of the SL master deformed the electroform. If the SL part were larger than this one, the thermal expansion problem would have been more serious. So burnout of solid RP master would fail for this process.

TABLE 3

Dimensional data of SL part versus electroformed nickel shell for example 2(unit:mm)

|  | D1 | D2 | D3 | L1 | L2 |
|---|---|---|---|---|---|
| Part 1 | 30.503 | 23.548 | 17.349 | 27.432 | 15.148 |
| Mold 1 | 32.365 | 24.618 | 17.565 | 27.983 | 15.326 |
| Deviation 1 | 1.862 | 1.069 | 0.216 | 0.551 | 0.178 |
| % deviation | 6.104 | 4.539 | 1.245 | 2.008 | 1.175 |

Example 3–4

Web Structure Inside the RP Master to Reduce the Thermal Stress

Figure 21A:
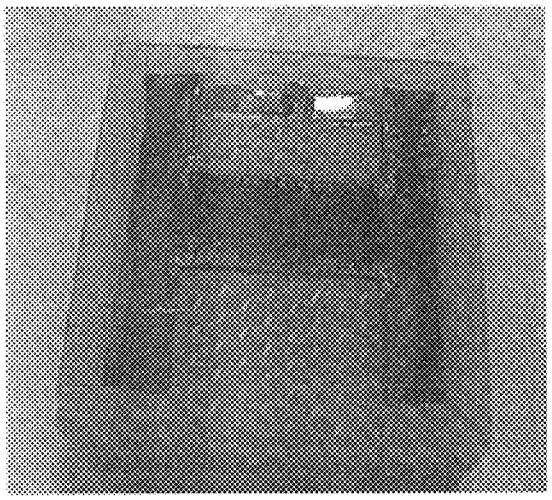
FIGS. 21A and B are views of a master formed using a web structure.
Figure 21B:
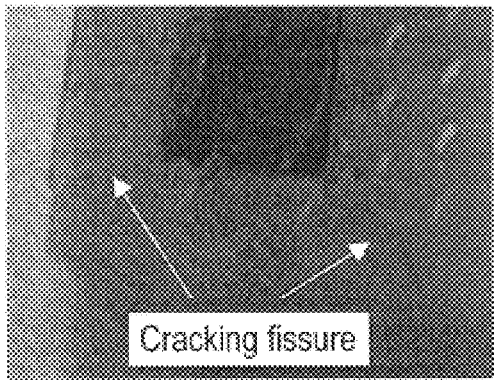
Figure 22A:
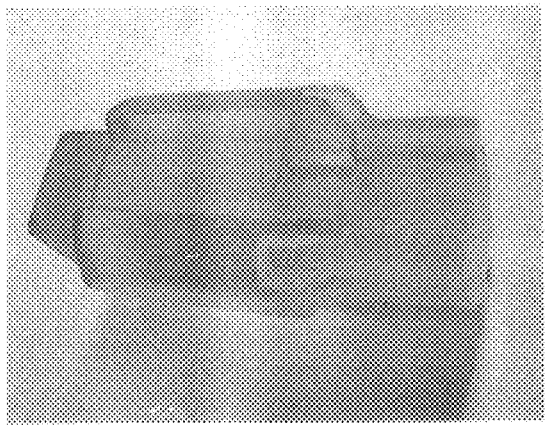
FIGS. 22A and B are views of a master formed using a web structure.
Figure 22B:
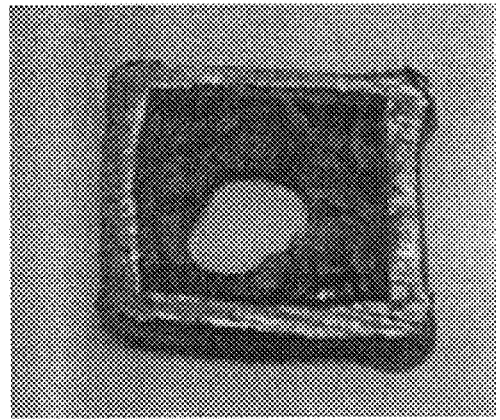

Since it was found that the solid RP master will deform the electroform during the burnout process, a web structure was then tried in the next experiment. SL masters as shown in example 3 (FIGS. 21A–B) and example 4 (FIGS. 22A–B) were built. The thickness of the wall enveloping the web structure is 1 mm. The web structure consists of interconnected hexagons with a side length of 3 mm and skin width of 0.8 mm. The master of example 3 was electroformed with 1 mm thick of copper inside the cavity (for EDM electrode). As the picture shows, the web structure is so weak that the electroforming stress cracked the SL master during the electroforming process. As shown in example 3, the corners of the SL master were cracked. The SL master of example 4 was nickel electroformed with a thickness of 2 mm. The deformation of the webbed SL by electroforming stress was so large that it could be observed visually and did not need to be measured. We only cut a small portion of example 4 to see the deformation. As shown, the metal square is largely deformed due to the SL master is significantly deformed. The conclusion is that web structure does not work for our process.

Example 5–6

Thick Wall RP Master with Burnout

Figure 23:
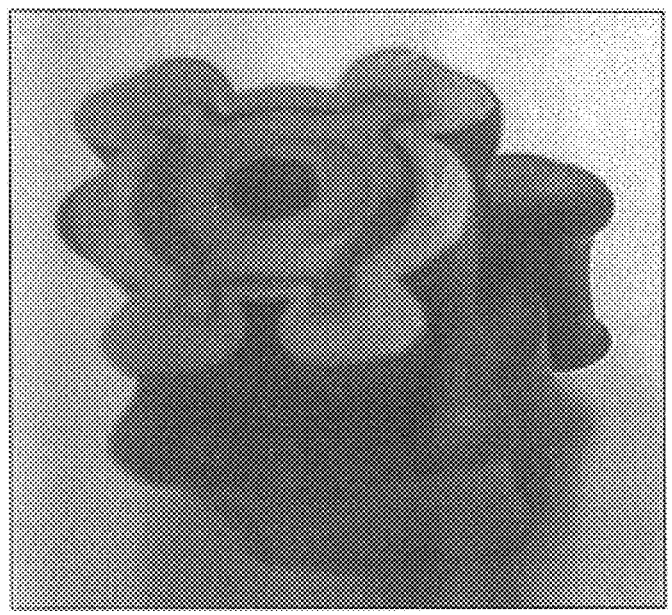
FIG. 23 is a view of a master with a metal layer formed according to the present invention.
Figure 24:
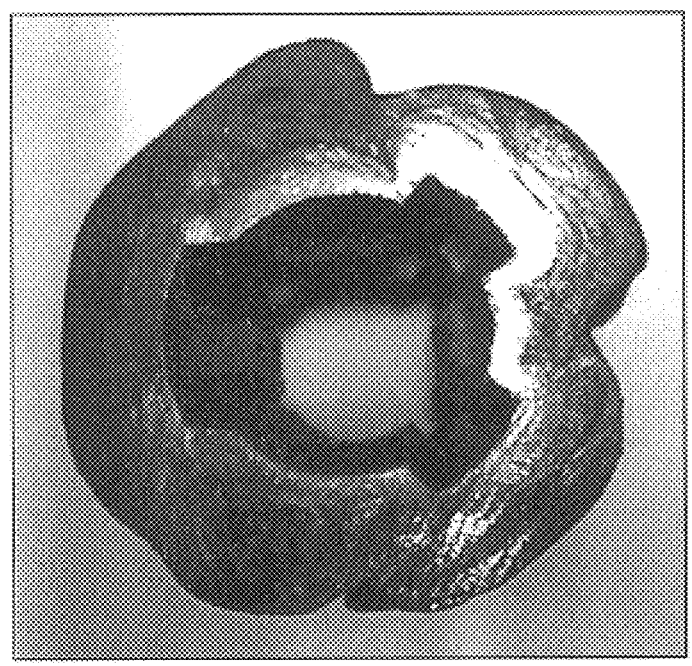
FIG. 24 is a view of nickel layer backed with copper according to the present invention.

Next, two SL masters with a wall thickness of 6 mm as shown in example 4 in FIGS. 23 and 24 were built. One SL master was electroplated with nickel at the thickness of 2 mm. Another SL master was electroplated with nickel at a thickness of 2 mm, and then electroplated another 2 mm copper at the surface of the nickel shell to back it. These two SL electroformed masters were burned out in the same oven at the same temperature as used before. Then we measured the two electroform at the same points as shown in example 2. Table 4 is the data recorded. From the data we can see that the dimensional deviation compared with solid SL part is much smaller. Also dimensional deviation for thicker electroform (2 mm nickel +2 mm copper) is also smaller than thinner electroform (2 mm in this case). The conclusion is that a thick walled RP master works for our process. However, determination of the wall thickness must satisfy two criteria: thick enough to resist the electroforming stress but thin enough to reduce the thermal stress induced by burnout. The wall thickness is related with material properties of the RP master, the geometry of the part to be made, the electroforming stress, the material properties of the electroformed metal and the thermal stress. So the determination of the wall thickness needs to be numerically simulated by means of finite element analysis (FEA).

TABLE 4

Dimensional data of SL parts versus nickel shells for example 5 and 6 (Unit:mm)

|  | D1 | D2 | D3 | L1 | L2 |
|---|---|---|---|---|---|
| Example 5 | 30.503 | 23.421 | 16.828 | 27.033 | 7.661 |
| Shell 5 | 30.579 | 23.477 | 16.868 | 27.089 | 7.666 |
| Deviation 5 | 0.076 | 0.056 | 0.040 | 0.056 | 0.005 |
| % deviation | 0.25 | 0.24 | 0.24 | 0.21 | 0.07 |
| Example 6 | 30.490 | 23.365 | 16.982 | 28.021 | 7.686 |

TABLE 4-continued

Dimensional data of SL parts versus nickel shells for example 5 and 6 (Unit:mm)

|  | D1 | D2 | D3 | L1 | L2 |
|---|---|---|---|---|---|
| Shell 6 | 30.546 | 23.406 | 17.010 | 28.067 | 7.689 |
| Deviation 6 | 0.056 | 0.041 | 0.028 | 0.046 | 0.003 |
| % deviation | 0.18 | 0.17 | 0.16 | 0.16 | 0.04 |

Examples 7–25

Computer Generated 18 Models

Figure 25:
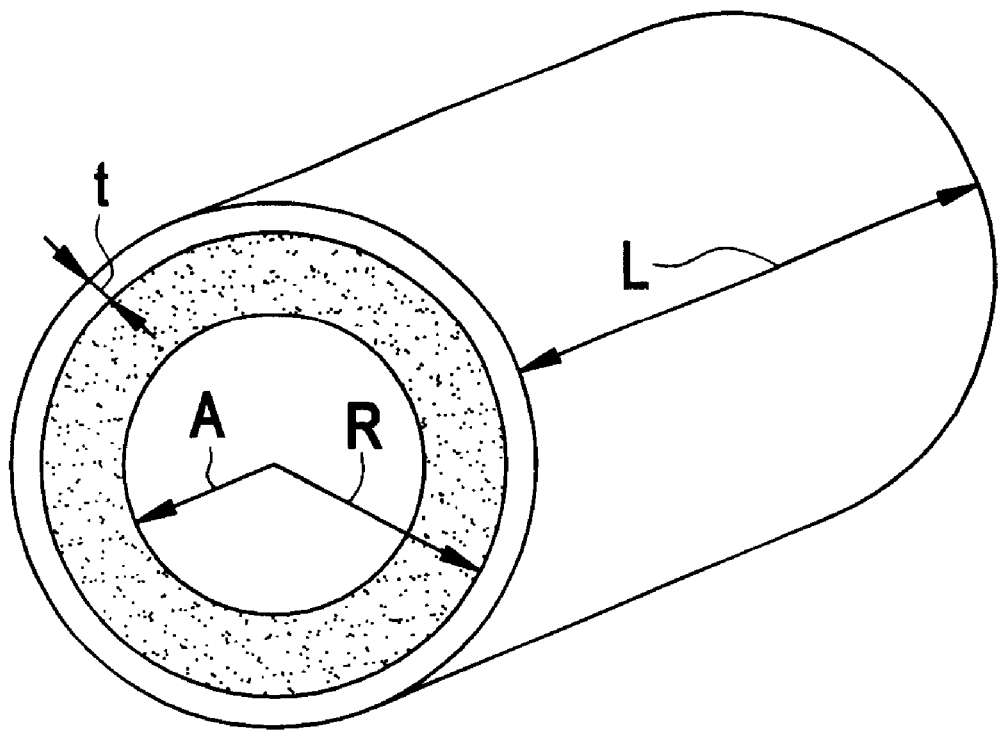
FIG. 25 is a diagrammatic view of a master configuration representative of the data used for examples 7–25.
Figure 26A:
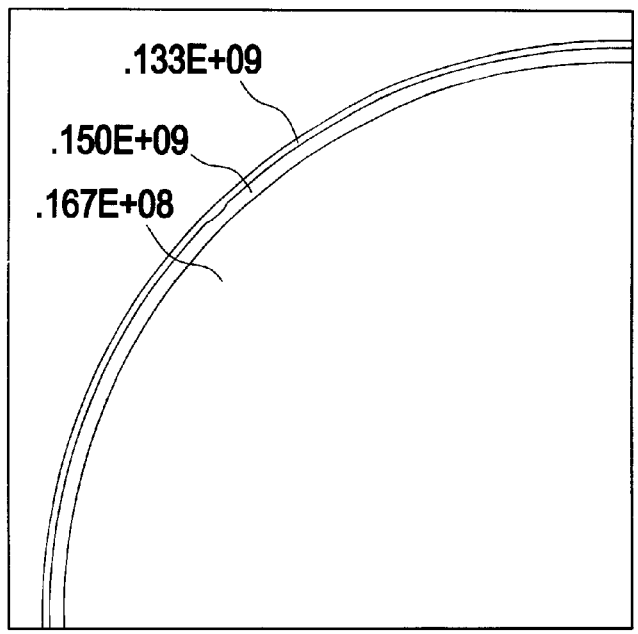
FIGS. 26A–D are graphs of simulated thermal stresses for different rapid prototyping and electroform thicknesses.
Figure 26B:
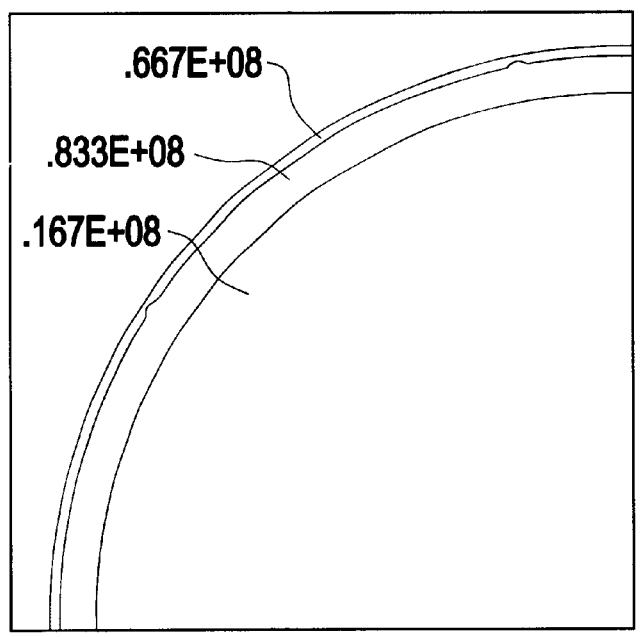
Figure 26C:
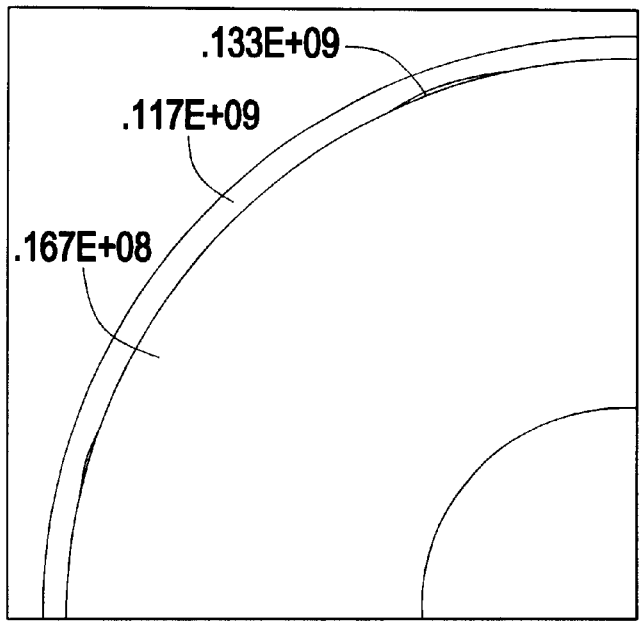
Figure 26D:
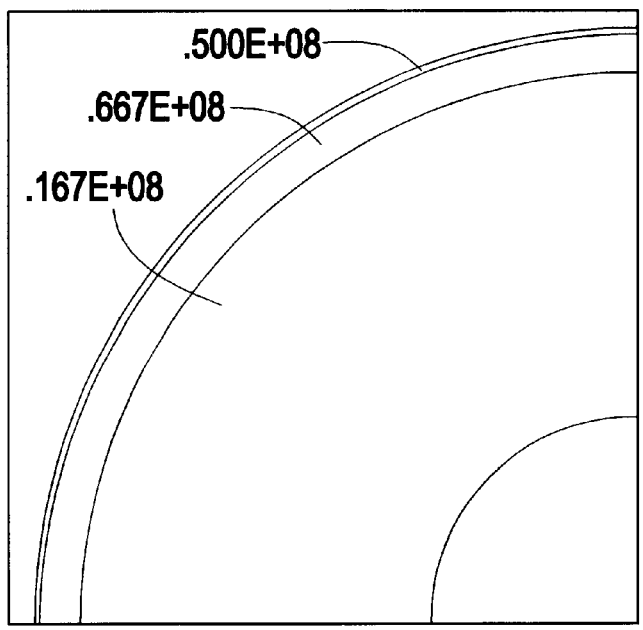

In order to understand the relationship between the wall thickness of the RP master and the five factors: material properties of the RP master, the geometry of the part to be made, the electroforming stress, the material properties of the electroformed metal and the thermal stress induced during burnout, a 100 mm long cylinder with 100 mm diameter SL master, as shown in FIG. 25, are analyzed using 18 sets of different parameters. The mechanical and thermal properties of SL 5170 and electroformed nickel. A and t are variables used to perform the analysis. A=0 means that the SL master is a solid. t is the thickness of the electroform, and total six thickness we used, i.e., t=1, 2, 3, 4, 5, 6 mm. First, a thermal analysis was performed to obtain the temperature distribution in the whole model. Then a structure analysis using the temperature obtained to simulate the thermal stress was performed. The thermal stresses change versus burning time and the largest stresses are recorded. The results are listed in the following table 5. The yield strength of the electroformed nickel at 560° C. is 136 MPa, i.e., if the thermal stress is larger than 136 MPa, the nickel shell will fail. Also we suppose the accuracy of the mold to be made is 0.025 mm. The workable values for thermal stress are value that are less than 136 MPa and the preferred values for thermal stress are values that are less than 110 MPa. The workable values for ED are values that are less than 0.025 mm and the preferred values are values that are less than 0.02 mm. It is to be understood that the SL master in these examples have open ends so that it can expands freely at horizontal direction. If one end is closed, the thermal stress could be larger than the ones given here. In practical, the geometry of the object is much more complex, so the determination of the wall thickness is more difficult but can be solved by invented method.

TABLE 5

Thermal stress (TS, unit: MPa) and electroforming deformation (ED, unit: mm) for 18 sets of parameters A and t.

| Electroform thickness | | 1 | 2 | 3 | 4 | 5 | 6 |
|---|---|---|---|---|---|---|---|
| Solid | TS | 273 | 144 | 102 | 81.3 | 69.6 | 62.3 |
|  | ED | 0.0024 | 0.0046 | 0.0067 | 0.0078 | 0.0109 | 0.0128 |
| A = 25 mm | TS | 229 | 119 | 83.4 | 66.5 | 57.5 | 52.7 |
|  | ED | 0.0043 | 0.0085 | 0.0142 | 0.0187 | 0.0231 | 0.0275 |
| A = 35 mm | TS | 113 | 59.2 | 42 | 34.6 | 31.5 | 30.3 |
|  | ED | 0.0096 | 0.0194 | 0.0282 | 0.0372 | 0.0461 | 0.0547 |

Analysis of Thermal Stress Computations

An SL cylinder with outer radius of 50 mm and length of 100 mm is nickel electroformed and then burned. The dimension of the inner hole of the cylinder A and the electroform thickness t are variables. The thermal stress is analyzed using the thermomechanical model. We assume the oven is preheated to the burnout temperature (560° C. for SL 5170) and it is constant during the burning process. To solve this problem, ANSYS 5.4, a finite element analysis software, is used to simulate the thermal stress resulted from the burnout process.

Figure 27:
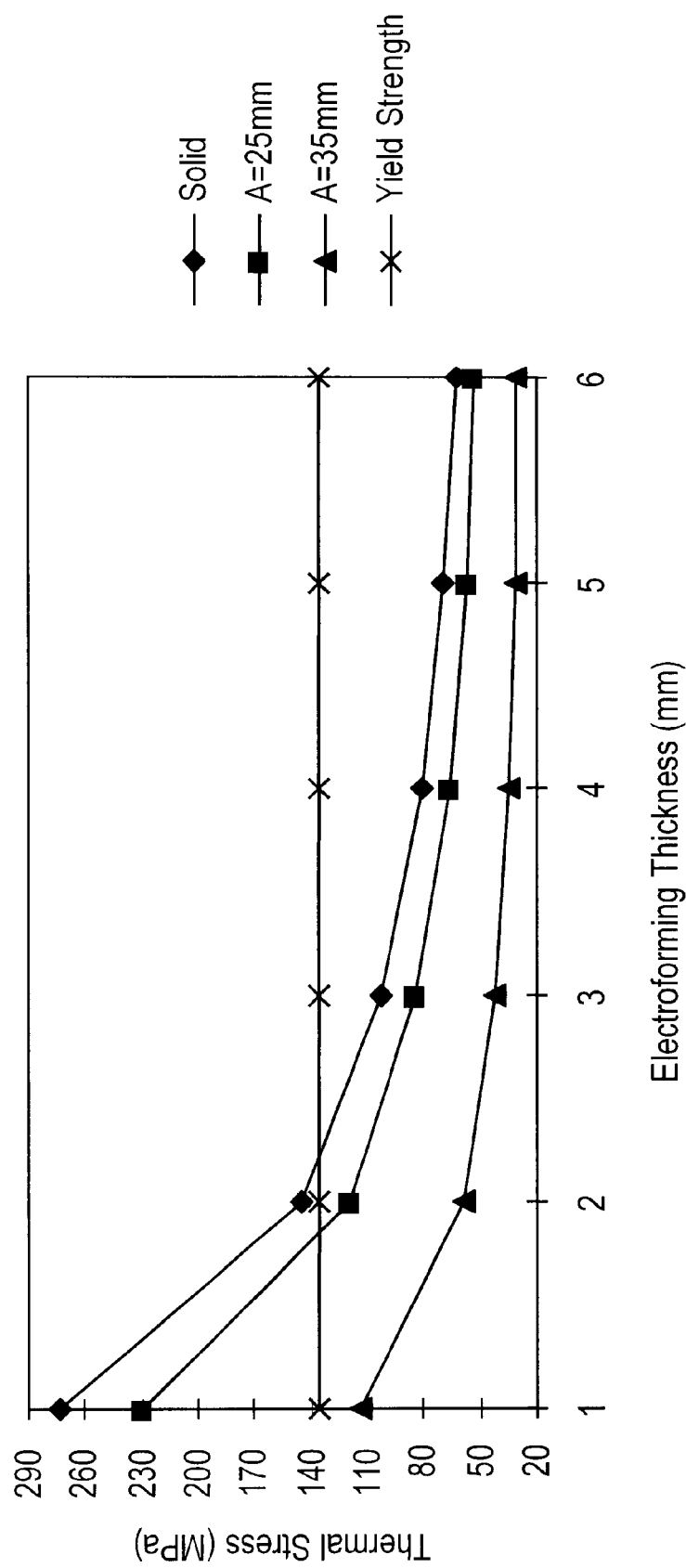
FIG. 27 illustrates a graph of Maximum thermal stress vs. electroform thickness for burnout process.
Figure 28:
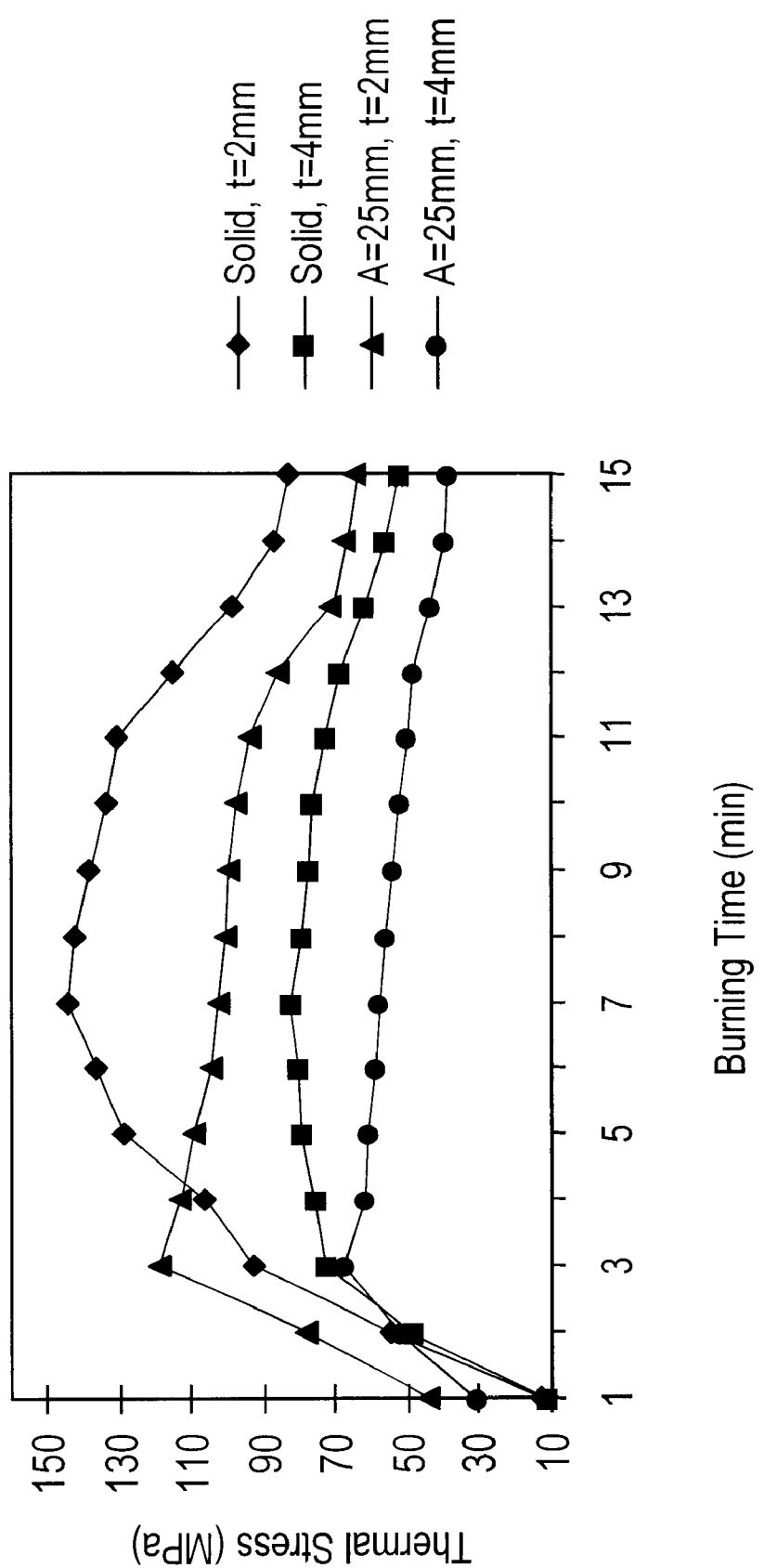
FIG. 28 illustrates a graph of Maximum thermal stress vs. time during burnout process.

FIGS. 26A–D illustrate the thermal stress simulation with different structure of SL parts and electroform thickness. For solid SL parts, when electroform thickness increases from 2 mm to 4 mm, the maximum thermal stress decreases from 144 MPa to 81.3 MPa. If the SL part is built with a inner hole of 25 mm radius, compared with solid SL part the maximum thermal stress with 2 mm electroform thickness reduces from 144 MPa to 119 MPa, and that with 4 mm electroform thickness reduces from 81.3 MPa to 66.5 MPa. FIG. 27 illustrates that with the same SL part structure, the maximum thermal stress decreases when the electroform thickness increases. Inner hole can always decreases the thermal stress, and the larger the hole, the smaller the thermal stress. This demonstrates that the thermal stress induced by the burnout process can be reduced when a RP part is built with a uniform wall thickness so that the RP part is an inner hollow structure. FIG. 28 illustrates the relationship between the thermal stress on the electroform when used with a solid and hollow RP master. The structure needs to be strong enough to resist the electroforming stress which is determined by the electroforming process parameters. In this case if the electroforming stress exerted on the electroformed nickel shell is 10 MPa, the deformation caused by the electroforming stress can be calculated and is listed in Table 6. From the table , we can see that for a specified electroforming thickness, solid SL part always has smaller electroforming deformation (ED). As the wall thickness decreases, the ED increases. Table 7 lists the build time and material costs for different SL parts. It can be seen that the inner hollow structure can save build time and materials.

TABLE 6

Electroforming deformation (ED) for different sets of parameters A and t

|  | t = 1 mm | t = 2 mm | t = 3 mm | t = 4 mm | t = 5 mm | t = 6 mm |
|---|---|---|---|---|---|---|
| A = 0 mm | 0.0024 | 0.0046 | 0.0067 | 0.0078 | 0.0109 | 0.0128 |
| A = 25 mm | 0.0043 | 0.0085 | 0.0142 | 0.0187 | 0.0231 | 0.0275 |
| A = 35 mm | 0.0096 | 0.0194 | 0.0282 | 0.0372 | 0.0461 | 0.0547 |

TABLE 7

Comparison of build time and material cost for different SL parts

|  | Build Time (Hour) | SL 5170 Material Cost (USD) |
|---|---|---|
| Solid | 35.27 | 161.63 |
| A = 25 mm | 26.46 | 121.25 |
| A = 35 mm | 17.98 | 82.43 |

While the invention has been described in terms of what are presently considered to be preferred embodiments, it is to be understood that the invention need not be limited to the disclosed embodiments. On the contrary, it is intended to cover various modifications and similar arrangements included within the spirit and scope of the appended claims, the scope of which should be accorded with the broadest interpretation so as to encompass all such modifications and similar structures.

What is claimed is:

1. A method for producing objects by integration of an electroforming deposition and a solid freeform design and fabrication machine consisting of the steps of:
   providing a predetermined shape of an object to be produced;
   generating a rapid prototyping master having a shape corresponding to said predetermined shape of said object and defining a generally hollow interior;
   generating an anode by computer aided design, said anode having an offset distance from and conforming to said shape of said rapid prototyping master;
   electroforming a layer of metal upon said rapid prototyping master to form a cathode shell on said rapid prototyping master;
   removing said rapid prototyping master from said cathode shell, wherein a shape of said cathode shell conforms to said predetermined shape of said object.

2. The method of claim 1 wherein generating said master step includes:
   designing said rapid prototyping master using a computer aided design workstation; and
   forming said master using a rapid prototyping machine.

3. The method of claim 1 wherein generating said anode step includes the conforming of said anode to said shape of said rapid prototyping master and is performed by using a rapid prototyping machine.

4. The method of claim 2 wherein designing said master step includes:
   analyzing a thickness of said shell of said rapid prototyping master to optimize the tradeoff between minimizing said thickness of said shell to aide in burn out and maximizing said thickness of said shell to withstand electroforming stress; and
   selecting a preferred thickness of said shell.

5. The method of claim 1 wherein said electroforming step includes:
   metalizing said anode and said rapid prototyping master.

6. The method of claim 5 wherein said electroforming step includes:
   aligning said anode and cathode at an equal distance apart within an electroform bath; and
   creating an electrical charge between said anode and said master.

7. A method for producing an object by integration of electroforming deposition and a solid freeform design and fabrication machine comprising the steps of:
   (a) independently fabricating an object by:
      (i) providing a predetermined shape of an object to be produced;
      (ii) generating a rapid prototyping master having a shape corresponding to said predetermined shape of said object and defining a generally hollow interior;
      (iii) generating an anode by computer aided design having an offset distance from and conforming to said shape of said rapid prototyping master;
   (b) independently fabricating a mold subsequent to fabrication of said object in step (a) by:
      (i) electroforming at one time a layer of metal upon said rapid prototyping master to form a cathode; and
      (ii) removing after the electroforming at one time recited in step (b) (1) said rapid prototyping master from said cathode by heat, wherein a shape of said cathode comprises a second shell conforming to said shape of said object.

8. The method of claim 7, wherein step (a) (ii) includes generating said rapid prototyping master using a computer aided design workstation.

9. The method of claim 7, wherein the conforming of said anode step in (a) (iii) to said shape of said rapid prototyping master is performed by using a rapid prototyping machine.

10. The method of claim 9, wherein step (a) (ii) includes
    (1) analyzing a thickness of said shell of said rapid prototyping master to optimize the tradeoff between minimizing said thickness of said shell to aide in burn out and maximizing said thickness of said shell for withstanding electroforming stresses; and
    (2) selecting a preferred thickness of said shell from the analysis in step (1).

11. The method according to claim 7, wherein step (b) (i) includes metalizing said anode and said rapid prototyping master.

12. The method according to claim 11, wherein step (b) (i) further includes
    aligning said anode and said cathode at an equal distance apart within an electroform bath; and
    creating an electrical charge between said anode and said rapid prototyping master.

* * * * *